(12) United States Patent
Baeza

(10) Patent No.: US 9,931,987 B2
(45) Date of Patent: Apr. 3, 2018

(54) HITCH MOUNTED PLATFORM

(71) Applicant: Hugo Baeza, Whitehall, PA (US)

(72) Inventor: Hugo Baeza, Whitehall, PA (US)

(*) Notice: Subject to any disclaimer, the term of this patent is extended or adjusted under 35 U.S.C. 154(b) by 0 days.

(21) Appl. No.: 15/342,731

(22) Filed: Nov. 3, 2016

(65) Prior Publication Data

US 2017/0120830 A1    May 4, 2017

Related U.S. Application Data

(60) Provisional application No. 62/250,453, filed on Nov. 3, 2015.

(51) Int. Cl.
*B60R 3/00* (2006.01)
*B60D 1/58* (2006.01)
*B60R 19/48* (2006.01)

(52) U.S. Cl.
CPC ............... *B60R 3/007* (2013.01); *B60D 1/58* (2013.01); *B60R 19/48* (2013.01)

(58) Field of Classification Search
CPC  B60R 3/007; B60R 3/00; B60R 3/002; B60R 3/02; B60R 19/48; E06C 5/00; E06C 5/36; B60D 1/58
See application file for complete search history.

(56) References Cited

U.S. PATENT DOCUMENTS

| | | | | |
|---|---|---|---|---|
| 4,203,611 A * | 5/1980 | Makela | ................... | B60R 3/002 280/163 |
| 5,769,439 A * | 6/1998 | Thompson | .............. | B60R 3/002 280/163 |
| 5,829,774 A * | 11/1998 | Klemp | .................... | B60R 3/007 280/164.1 |
| 6,203,040 B1 * | 3/2001 | Hutchins | ................. | B60R 3/002 182/90 |
| D527,323 S * | 8/2006 | Storer | .......................... | D12/203 |
| 7,377,564 B1 * | 5/2008 | Baffy | ........................ | B60R 3/00 293/117 |
| 9,096,105 B1 * | 8/2015 | Spiller | ...................... | B60D 1/06 |
| 2003/0011163 A1 * | 1/2003 | Coomber | ................ | B60R 3/002 280/163 |
| 2003/0164390 A1 * | 9/2003 | Higginbotham, III | .... | B60R 9/06 224/519 |

* cited by examiner

*Primary Examiner* — Frank B Vanaman
(74) *Attorney, Agent, or Firm* — Dunlap Bennett & Ludwig PLLC; Brendan Squire

(57) ABSTRACT

A receiver hitch mountable platform that may be configured to a variety of uses, such as a step, carrier, ramp, or other purposes. The platform provides an attachment plate that may receive a plurality of accessories attached thereto via fasteners.

17 Claims, 3 Drawing Sheets

HITCH MOUNTED PLATFORM

CROSS-REFERENCE TO RELATED APPLICATION

This application claims the benefit of priority of U.S. provisional application No. 62/250,453, filed Nov. 3, 2015, the contents of which are herein incorporated by reference.

BACKGROUND OF THE INVENTION

The present invention relates to accessories for land vehicles such as passenger trucks, sport utility vehicles (SUVs), and automobiles, and more particularly to accessories for mounting to a receiver hitch structure on the land vehicles.

Many commercial vehicles, trucks, SUVs and minivans have rear doors that sit much higher off the ground than conventional side doors. This makes for a difficult for passengers getting in and out of the vehicle's rear access door.

Hitch steps are commonly used as rear bumper protectors but their size and design does not serve as a safe ingress or egress device. Other hitch mounted step devices are shaped as an elongated cylinder or tubular design welded to a square tubing receiver attachment, generally 3 inches in width with a plastic step pad of approximately 12 inches in length and 2.5 in width making for a very small foot placement area for the passenger's footing. Moreover, the construction of these devices is such that it is limited to use as a step is not adaptable to different uses that the vehicle user may need for other purposes.

As can be seen, there is a need for an improved step mounting platform that provides a substantially larger, more secure foot placement area, while providing adaptability to various uses suited for the vehicle.

SUMMARY OF THE INVENTION

In one aspect of the present invention, a hitch mountable support platform, includes a mounting platform having an elongate plate with a substantially flat upper surface, a plurality of support ribs extending downwardly from a lower surface of the elongate plate along a longitudinal length thereof, and a plurality of holes through the elongate plate disposed in a spaced apart relation. A receiver adapter having an aft end that is attached to the lower surface of the elongate plate and a forward end that extends forwardly of a forward edge of the elongate plate. A bumper may be secured to the mounting platform via a fastener extending through a shouldered slot defined along a longitudinal length of the bumper and received in one of the plurality of attachment holes in the mounting platform. An end cap may cover a first end and a second end of the bumper. The bumper is preferably formed as an extrusion that is longer than a length of the mounting platform.

In some embodiments of the invention, a plurality of support members extend downwardly from a bottom of the elongate plate and extend along a majority of the longitudinal length of the elongate plate. The bumper may be formed as a triple wall aluminum extrusion that is secured on the mounting platform with fasteners. In other embodiments, a step plate substantially covers a top portion of the bumper. The step plate may include a plurality of laser cut apertures through which a plurality footing protrusions may be received. The plurality of footing protrusions may be formed from one of a plastic or a rubberized layer disposed between the step plate and the bumper.

In other aspects of the invention, the step plate is attachable to the bumper in a snap-fit configuration. A trailing edge surface defined along a longitudinal length of the step plate; and a longitudinal slot defined in an aft facing surface of the bumper, are configured such that the trailing edge is received in the longitudinal slot in the snap-fit configuration. In yet other embodiments of the invention, an arcuate forward edge of the step plate is configured to provide a flexible engagement surface between the arcuate forward edge and an aft end of a motor vehicle.

These and other features, aspects and advantages of the present invention will become better understood with reference to the following drawings, description and claims.

DETAILED DESCRIPTION OF THE INVENTION

Figure 1:
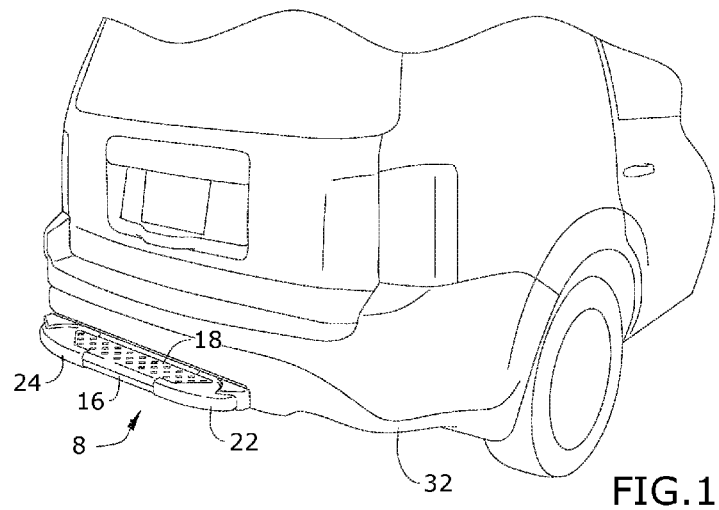
FIG. 1 is a perspective view of a hitch mounted platform, shown in use attached to a receiver hitch of a motor vehicle.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a receiver hitch mountable platform that may be configured to a variety of uses, such as a step, a carrier, a ramp, or other purposes.

As stated above, commercial vehicles, trucks and minivans have rear doors that sit much higher off the ground than conventional side doors. This makes it excessively difficult to for a passenger to get into and out of the vehicle's rear access door. This can also lead to scratching or marring of the vehicle's bumper, when so equipped. As seen in reference to FIG. 1, in some aspects of the present invention, a second lower platform step 8 is provided at the rear area of a motor vehicle 32, such as a van, truck, minivan and or SUV in order to make it more accessible to a user.

Motor vehicles 32 are commonly equipped with a receiver hitch 26 and may include 1¼; 2 and 2½ inch receivers for receiving a ball mount for carrying an item, such as pulling a trailer. The size of the receiver opening 31 is normally related to the towing capacity of the hitch 26. The present invention is suitable for use with any size receiver 26.

Figure 2:
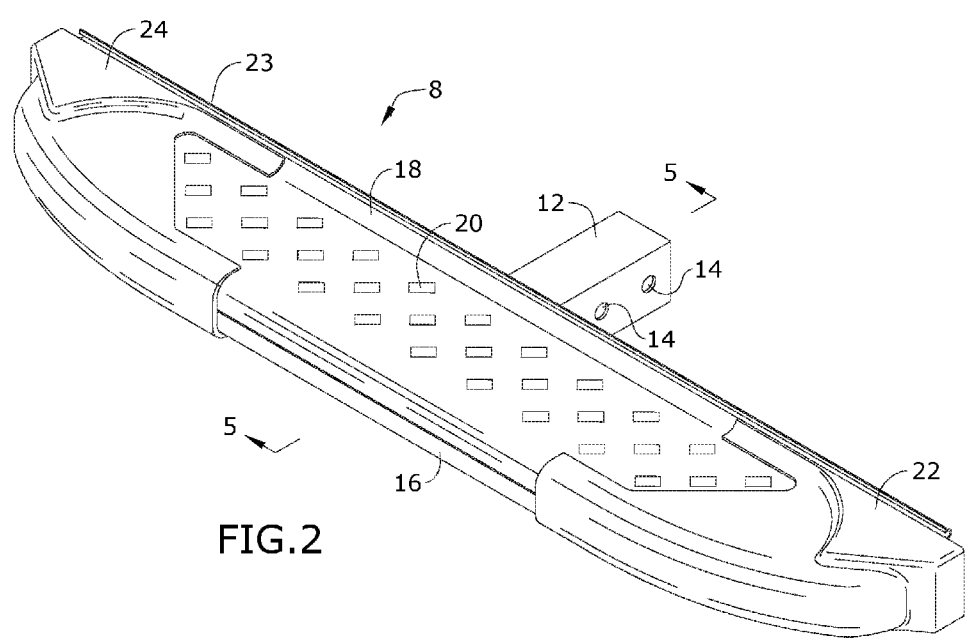
FIG. 2 is a top perspective view of the hitch mounted platform.
Figure 3:
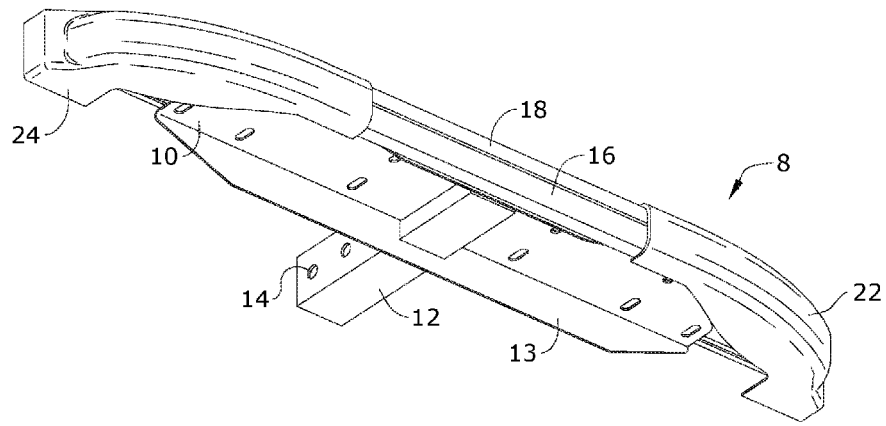
FIG. 3 is a bottom perspective view of the hitch mounted platform.

As seen in reference to FIGS. 1-3 and embodiment of the present invention is illustrated to provide a mounting platform for accessories adapted for use with a motor vehicle 32 equipped with a receiver hitch 26. The mounting platform 8 includes an elongate plate 10 with a receiver adapter 12 mounted at substantially a midpoint of the elongate plate 10 and extending forwardly for coupling to a receiver hitch 26 of a motor vehicle 32. The adapter plate 10 has a plurality of attachment holes 11 disposed in a spaced apart relation that extend through an upper surface to a lower surface of the elongate plate 10. The upper surface is preferably a substantially flat surface. The elongate plate 10 may be between about 25-35 inches in length and between about 4-8 inches in width, preferably about 30×5 inches.

Figure 4:
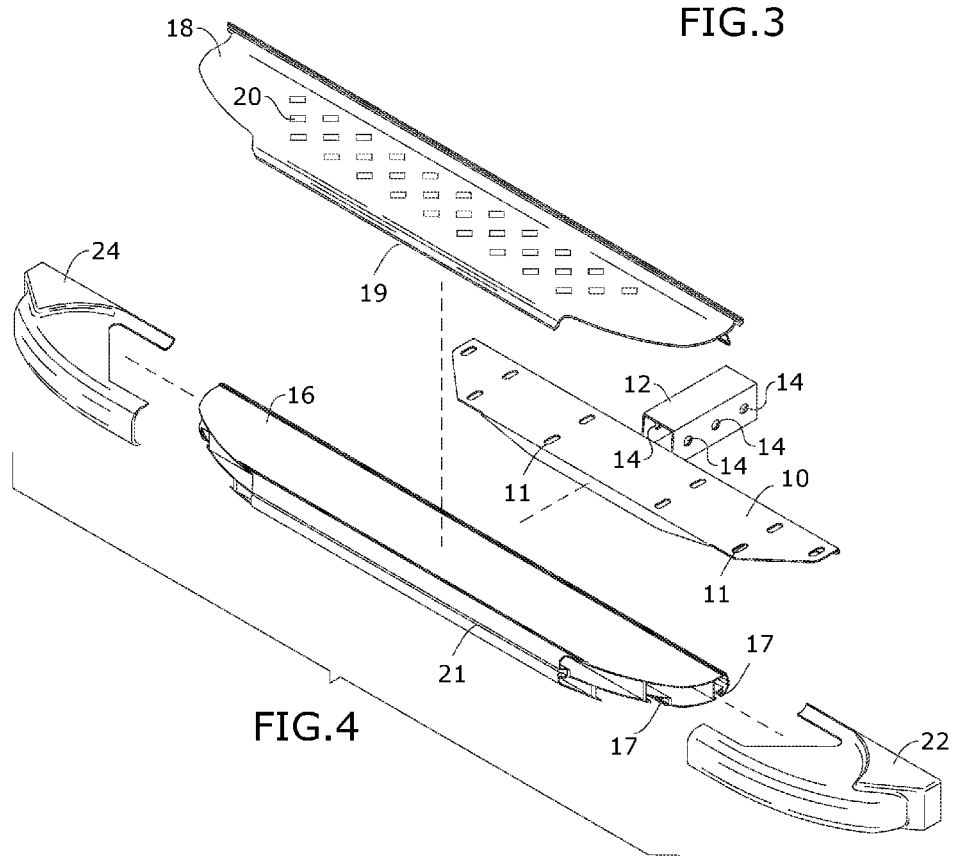
FIG. 4 is an exploded view of the hitch mounted platform.

As seen in reference to FIGS. 3 and 4, the lower surface of the elongate plate 10 may comprise a plurality of support members 13 extending downwardly from the surface to provide additional structural support. The support members 13 may extend across a majority of the longitudinal length of the elongate plate 10. A forward support member 13 has an aperture defined therein to permit passage of the receiver adapter 12.

Figure 5:
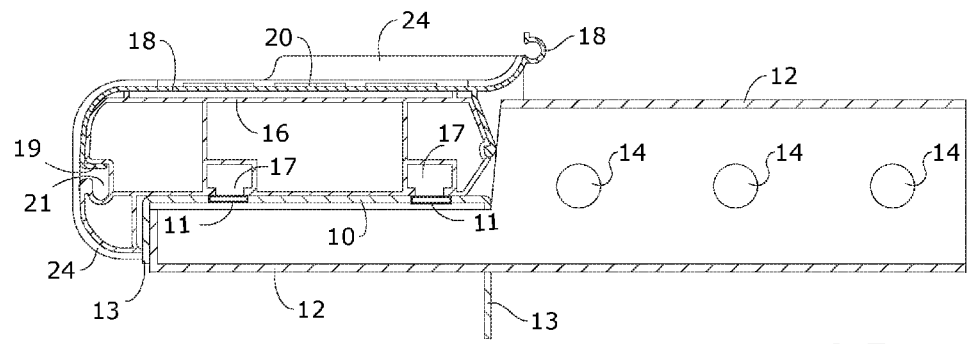
FIG. 5 is a section view of the hitch mounted platform, taken along line 5-5 in FIG. 2.
Figure 6:
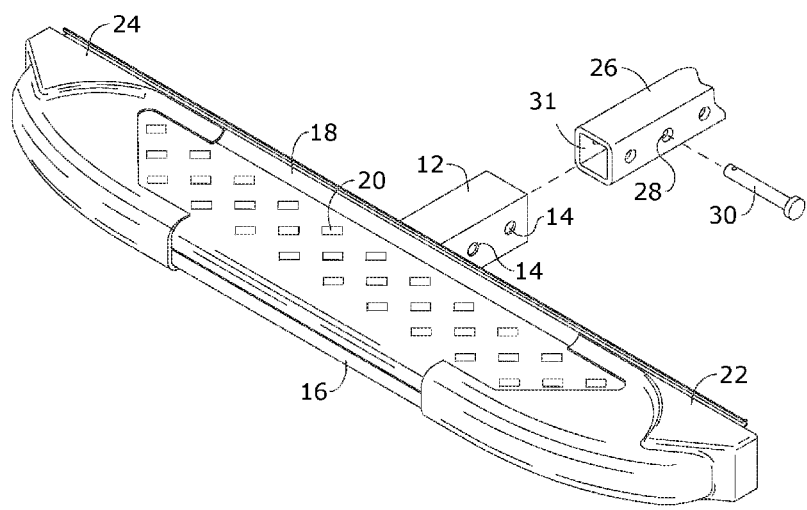
FIG. 6 is a perspective view of the hitch mounted platform, illustrating the placement of post 12 into exemplary hitch 26.

The receiver adapter 12 will preferably have a length so that it extends across a substantial lateral dimension of the elongate plate 10. The receiver adapter 12 may be welded to the elongate plate 10 and the support members 13. As seen in reference to FIGS. 4-6, the forward end of the receiver adapter 12 may have a plurality of bores 14 extending in a transverse horizontal dimension to provide adjustment of the platform position relative to the back end of the motor vehicle 32.

As will be appreciated the bores 14 receive an attachment pin 30, bolt, or locking device to secure the receiver adapter 12 in the receiver hitch 26. The forward end of the receiver adapter 12 may have the same or different dimensions than the aft end of the receiver adapter 12.

As further seen in reference to the drawings, the mounting platform 10 may be covered with a number of different outer members such as a bumper 16. In the example shown the bumper 16 may be secured to the mounting platform 10 via a plurality of fasteners, such as bolts, clips, or pins extending through the attachment holes 11, which may be aligned in a spaced apart manner along a longitudinal length of the mounting platform 10. The bumper 16 may be formed as an aluminum extrusion or other suitable material that may be formed to have longer dimensions than the mounting platform 10.

Preferably the bumper 16 comprises a 37 inch triple wall aluminum extrusion that is bolted on the mounting platform 10 and secured with fasteners. A head of the fasteners may be received within a shouldered slot 17 defined along a longitudinal length of the bumper 16. The slot 17 is aligned with the attachment holes 11 of the mounting platform. The bumper 16 may further comprise end caps 22, 24 shaped to a desired appearance, and enclosing the ends of the triple wall aluminum extrusion 16. The end caps 22, 24 may be comprised of metal, plastics, fiberglass and the like.

A step plate 18 may cover the bumper 16 to provide a decorative and durable step surface for the apparatus of the present invention. The step plate may be defined with a plurality of laser cut apertures through which the ends of a plurality footing protrusions 20 may be received. The footing protrusions 20 may be formed in a plastic or rubberized layer 20 disposed between the step plate 18 and the bumper. In a preferred embodiment, the step plate 18 may be snap fit to the bumper 16 by the cooperative engagement of a trailing edge surface 19 of the step plate 18 and a longitudinal slot 21 defined in an aft facing surface of the bumper 16. A forward edge 23 of the step plate 18 is configured with an arcuate shape so as to provide a flexible engagement surface between the forward edge 23 of the step plate 18 and an aft end of the motor vehicle 32.

It should be understood, of course, that the foregoing relates to exemplary embodiments of the invention and that modifications may be made without departing from the spirit and scope of the invention as set forth in the following claims.

What is claimed is:

1. A hitch mountable support platform for attachment to a motor vehicle, comprising:
   a mounting platform comprising an elongate plate with a substantially flat upper surface, a plurality of support members extending downwardly from a lower surface of the elongate plate along a longitudinal length thereof, and a plurality of attachment holes defined through the elongate plate disposed in a spaced apart relation;
   a receiver adapter having an aft end attached to the lower surface of the elongate plate and a forward end extending forwardly of a forward edge of the elongate plate;
   a bumper having a longitudinal slot defined in an aft facing surface of the bumper secured to the mounting platform via a fastener extending through the plurality of attachment holes in the mounting platform; and
   a step plate attachable to the bumper in a snap-fit configuration substantially covering a top portion of the bumper, the step plate having an arcuate forward edge configured to provide a flexible engagement surface between the forward edge of the step plate and an aft end of the motor vehicle, a trailing edge surface defined along a longitudinal length of the step plate; the trailing edge received in the longitudinal slot of the bumper in the snap-fit configuration.

2. The hitch mountable support platform of claim 1, wherein the bumper is secured to the mounting platform via a fastener extending through a shouldered slot defined along a longitudinal length of the bumper.

3. The hitch mountable support platform of claim 2, further comprising:
   an end cap covering a first end and a second end of the bumper.

4. The hitch mountable support platform of claim 3, wherein the bumper is longer than a length of the mounting platform.

5. The hitch mountable support platform of claim 4, wherein the bumper comprises a triple wall aluminum extrusion that is secured on the mounting platform with fasteners.

6. The hitch mountable support platform of claim 1, wherein the step plate comprises a plurality of apertures through which a plurality of footing protrusions may be received.

7. The hitch mountable support platform of claim 6, wherein the plurality of footing protrusions are formed of one of a plastic or a rubberized layer disposed between the step plate and the bumper.

8. A hitch mountable support platform, comprising:
   a mounting platform comprising an elongate plate with a substantially flat upper surface, a plurality of support members extending downwardly from a bottom of the elongate plate and extending along a majority of the longitudinal length of the elongate plate, and a plurality of attachment holes through the elongate plate disposed in a spaced apart relation;
   a receiver adapter having an aft end attached to the lower surface of the elongate plate and a forward end extending forwardly of a forward edge of the elongate plate;
   a bumper secured to the mounting platform via a fastener extending through a shouldered slot defined along a longitudinal length of the bumper and the plurality of attachment holes in the mounting platform;

an end cap covering a first end and a second end of the bumper;

a step plate substantially covering a top portion of the bumper, a trailing edge surface defined along a longitudinal length of the step plate; and a longitudinal slot defined in an aft facing surface of the bumper, wherein the trailing edge is received in the longitudinal slot in a snap-fit configuration.

9. The hitch mountable support platform of claim 8, further comprising:

an arcuate forward edge of the step plate, configured to provide a flexible engagement surface between the arcuate forward edge and an aft end of a motor vehicle.

10. The hitch mountable support platform of claim 8, wherein the step plate comprises a plurality of apertures through which a plurality of footing protrusions may be received.

11. The hitch mountable support platform of claim 8, wherein the plurality of footing protrusions are formed of one of a plastic or a rubberized layer disposed between the step plate and the bumper.

12. A hitch mountable support platform, comprising:

a mounting platform comprising an elongate plate with a substantially flat upper surface, and a plurality of attachment holes defined through the elongate plate disposed in a spaced apart relation;

a receiver adapter having an aft end attached to the lower surface of the elongate plate and a forward end configured for cooperative engagement with the hitch;

a bumper having a longitudinal slot defined in an aft facing surface of the bumper, the bumper configured to be secured to the mounting platform via a fastener engaged with the plurality of attachment holes in the mounting platform;

a step plate configured to substantially cover a top portion of the bumper, and a trailing edge surface defined along a longitudinal length of the step plate;

wherein the trailing edge surface is configured to be received in the longitudinal slot in a snap-fit engagement.

13. The hitch mountable support platform of claim 12, further comprising:

an arcuate forward edge of the step plate configured to provide a flexible engagement surface between the arcuate forward edge and an aft end of a motor vehicle.

14. The hitch mountable support platform of claim 13, wherein the step plate comprises a plurality of apertures through which a plurality of footing protrusions may be received.

15. The hitch mountable support platform of claim 14, wherein the plurality of footing protrusions are formed of one of a plastic or a rubberized layer disposed between the step plate and the bumper.

16. The hitch mountable support platform of claim 12, wherein the fastener extends through a shouldered slot defined along a longitudinal length of the bumper and the plurality of attachment holes in the mounting platform.

17. The hitch mountable support platform of claim 12, further comprising:

an end cap configured to cover a first end and a second end of the bumper.

\* \* \* \* \*